United States Patent [19]
Jeter et al.

[11] 3,970,581
[45] July 20, 1976

[54] MULTIPLE GAS STREAMS IN THE POST OXIDATION STEP IN A PROCESS FOR CONVERTING URANIUM HEXAFLUORIDE TO URANIUM OXIDE RICH COMPOSITIONS

[75] Inventors: Donald Wayne Jeter; Walter Gill Keith, both of San Jose, Calif.

[73] Assignee: General Electric Company, San Jose, Calif.

[22] Filed: May 12, 1975

[21] Appl. No.: 576,699

[52] U.S. Cl. .......................... 252/301.1 R; 423/19; 423/260; 423/261
[51] Int. Cl.² ........................................ C01G 43/02
[58] Field of Search ............... 252/301.1 R; 423/260, 423/19, 261; 239/296, 297, 427.3, 290

[56] References Cited
UNITED STATES PATENTS

| | | | |
|---|---|---|---|
| 3,260,575 | 7/1966 | Heestand et al. | 423/261 |
| 3,365,274 | 1/1968 | Carpenter et al. | 423/613 |
| 3,382,042 | 5/1968 | Richardson et al. | 423/613 |
| 3,477,830 | 11/1969 | Hackstein et al. | 423/261 |
| 3,786,120 | 1/1974 | De Hollander et al. | 264/.5 |
| 3,790,493 | 2/1974 | Dada et al. | 252/301.1 R |
| 3,796,672 | 3/1974 | Dada et al. | 252/301.1 R |
| 3,814,327 | 6/1974 | Dada | 239/290 |

Primary Examiner—Benjamin R. Padgett
Assistant Examiner—Deborah L. Kyle
Attorney, Agent, or Firm—Ivor J. James, Jr.; Sam E. Laub; Samuel E. Turner

[57] ABSTRACT

This invention presents a process for conversion of gaseous uranium hexafluoride to an oxide product of uranium by introducing to a reaction zone in the presence of an active flame maintained in the reaction zone a first gaseous reactant comprising a mixture of uranium hexafluoride and an oxygen-containing gas and a second gaseous reactant comprising a reducing gas and temporarily separating the first and second gaseous reactants with a shielding gas which temporarily prevents substantial mixing and reaction between these gaseous reactants. The first and second gaseous reactants ultimately react in a primary flame to give a particulate uranium dioxide rich composition and residual reducing gas. An oxygen-containing gas as a third gaseous reactant is introduced through multiple downstream inlets with the inlet closest to the primary flame being at a location in the reaction zone where the uranium hexafluoride conversion to the uranium dioxide rich composition is substantially complete. Another embodiment of the process has the first gaseous reactant comprised of a mixture of uranium hexafluoride and a reducing gas and the second gaseous reactant comprised of an oxygen-containing gas. These processes result in oxidizing the uranium dioxide rich composition to a higher oxide of uranium with conversion of the residual reducing gas to its oxidized form.

28 Claims, 5 Drawing Figures

MULTIPLE GAS STREAMS IN THE POST OXIDATION STEP IN A PROCESS FOR CONVERTING URANIUM HEXAFLUORIDE TO URANIUM OXIDE RICH COMPOSITIONS

BACKGROUND OF THE INVENTION

Oxide products of uranium have various utilities including preferred utilities as fuels for nuclear reactors in the nuclear industry and catalysts.

The performance of the fuel elements, traditionally enriched uranium dioxide structures clad in a metal container, is crucial to the practical success of the nuclear reactor. Nuclear power generation has imposed severe requirements on the performance of fuel in nuclear reactors, especially on properties of grain size and density of the fuel. It has been demonstrated that fine grain uranium dioxide structures are more subject tp creep than large grain uranium dioxide structures. It has also been discovered that the density of the uranium dioxide is a very important physical property influencing the performance of the fuel. In fabricated forms, uranium dioxide is a ceramic capable of compaction to give a structure of desired density and a low impurity level.

The enrichment of uranium customarily takes place through use of the compound uranium hexafluoride so that a process is required for convertiing the enriched uranium hexafluoride into enriched uranium dioxide in a form which can be readily fabricated to structures having a low fluoride content and a desired density and grain size.

Current practice for converting uranium hexafluoride to an oxide product of uranium, usually uranium dioxide, employs hydrolysis of uranium hexafluoride to give a solution of uranyl fluoride and hydrogen fluoride from which ammonium diuranate is precipitated by the addition of ammonia. After filtration the ammonium diurante of high fluoride content is dissolved in nitric acid with fluoride decontamination of the resulting uranyl nitrate solution being accomplished by solvent extraction. From the resulting purified uranyl nitrate solution, ammonium diuranate is reprecipitated and then calcined to give $U_3O_8$ which in turn is reduced with hydrogen to give uranium dioxide.

Attempts have been made to replace this involved, expensive ammonium diuranate conversion process by gas phase reaction of uranium hexafluoride with a very successful method being described in copending U.S. Pat. No. 3,796,672 entitled Process for Producing Uranium Dioxide Rich Compositions from Uranium Hexafluoride which is hereby incorporated by reference. The foregoing application was filed Oct. 2, 1970 in the names of W. R. DeHollander and A. G. Dada and assigned to the same assignee as the present invention.

The practice of the process of U.S. Pat. No. 3,796,672 gives a uranium dioxide rich composition having particularly desirable properties and a gaseous atmosphere rich in reducing gas such as hydrogen. Since it is known that certain gaseous mixtures of a reducing gas such as hydrogen and air can e readily combustible and potentially explosive, it has been found desirable to convert any such gaseous mixture to its oxidized form during this process. Further a process sequence having a by-product gaseous atmosphere rich in a reducing gas such as hydrogen makes it undesirable to practice the process under vacuum condition because any air leaks in the process apparatus could result in localized explosive mixtures of hydrogen and air. Still further it would be desirable if this process could be improved to achieve uranium oxide compositions having higher oxide content such as $U_3O_8$ (uranium tritaoctoxide) and still retain the desirable properties of the uranium dioxide rich powder produced in the process described and claimed in the foregoing patent.

In an attempt to complement the practice of the process of U.S. Pat. No. 3,796,672 and convert the residual reducing gas to its oxidized form, a new process was conceived for the conversion of uranium hexafluoride to a uranium oxide rich composition. This process is claimed in U.S. Pat. No. 3,790,493 and has the introduction of an oxygen-containing gas at a time when the uranium hexafluoride conversion to a uranium dioxide rich composition is substantially complete in the reaction zone. This achieves improvements in the flame conversion of uranium hexafluoride to an oxide product. Any reducing gas in the reaction zone, usually in the form of hydrogen, reacts to form its oxidized product and the uranium dioxide rich composition is converted to a higher oxide of uranium (hereinafter uranium oxide rich composition) with the particular oxide of uranium depending on the molar ratio of oxygen to the sum of the moles uranium dioxde rich composition and the residual reducing gas. This molar ratio can be changed by varying the volume of oxygen-containing gas introduced. This process permits a safe practice of the uranium hexafluoride conversionn under vacuum conditions. This process requires no separate heating step as the temperature of the intermediate reaction products of the uranium dioxide rich composition and residual reducing gas in the reaction zone is sufficient to react the residual reducing gas with the oxygen-containing gas downstream from the position at which the latter gas is introduced. This is very desirable since raising the temperature at this position in the reaction zone can lead to a partial sintering of the particles of the resulting uranium oxide rich composition. Since fine size particles of oxide are desirable, especially for catalytic applications, the partial sintering is usually undesirable.

This process will now be described in greater detail with reference to FIGS. 1 and 2 where there is shown a preferred embodiment of the invention having a reactor in which the above-described process of U.S. Pat. No. 3,790,493 can be carried out. This embodiment has two concentric tubes 33 aand 38 and the nozzle 30 is mounted and sealed by seals 37 in a supporting means such as a cover 31 which forms an air tight seal (which can be disconnected) with reactor vessel 32 defining a reaction zone 29. Vessel 32 has outwardly protruding space 34 which holds a pilot burner 35 which receives gas and maintains a pilot flame 36 to initiate a flame reaction.

The nozzle 30 has a first inlet means in the form of tube 33 with tubular inlets 47 for introduction of a fluid reactant and a second inlet means in the form of a tube 38 for introduction of another fluid. Tube 38 has inlets 39 and a cover 40 with an opening for a tubular inlet 41 for introduction of a fluid. A third inlet means is disposed in tube 38 in the form of a tubular chamber 43 defining a volume 42 for receiving fluid from inlet 41. Chamber 43 has eight openings in the portion 44 of size equal to the external diameter of tubes 45 which are connected to chamber 43 such as by welding or threading so that tubes 45 receive the fluid from chamber 43. Tubes 33 and 38 extend further into the reaction zone 29 than tubes 45 by the distance generally designated "d". A directional control plate 46 is secured transversely in the lower portion of tube 38 at a distance "l" above the open ends of tubes 45 and this plate 46 is provided with openings through which tubes 45 extend. The plate 46 coaxially forms an annular opening around each tube 45. Plate 46 forces the shielding fluid to pass through the annular openings and then into the reaction zone surrounding the jets of fluid reactant from tubes 45. The relation between the size of the holes in the plate 46 and the thickness of the plate 46 is such that the shielding fluid passes between the plate 46 and the tubes 45 in approximately unidirectional flow toward the reaction zone 29. The symbol "l" is used to designate the distance between the open ends of tubes 45 and the directional control plate 46.

In use, a ccontinuous flow of a reactant of a reducing gas selected from the group consisting of hydrogen, dissociated ammonia and mixtures thereof is maintained in tube 33 to the reaction zone 29 throughout the reaction so that there is a strong reducing atmosphere generally maintained in the reaction zone 29. A shielding gas is fed through inlets 39 into tube 38 and into the reaction zone 29. The shielding gas can be a non-reactive gas selected from the group consisting of nitrogen, argon, helium, neon, krypton, xenon and mixtures thereof or the shielding gas can be a reactive gas selected from the group consisting of oxygen, air, or a mixture thereof, or either air, oxygen or a mixture of air and oxygen with any of the foregoing non-reactive gases. A reactant comprising a mixture of uranium hexafluoride and an oxygen-containing gas is fed through inlet 41, chamber 42 and tubes 45 into reaction zone 29. The oxygen-containing gas is selected from the group consisting of oxygen, air and mixtures thereof. The flows of the gases in tubes 38 and 45 occur so that the shielding gas in tube 38 surrounds the jets of gaseous reactant coming from tubes 45 as the gases enter the reaction zone 29. The shielding gas shields the mixture of uranium hexafluoride and the oxygen-containing gas from the reducing gas for sufficient time so that the boundary of initiation of the reaction flame 48 in the reaction zone 29 is removed from contact with tubes 38 and this is referred to as a "lifted flame".

The oxygen-containing gas as the third reactant is introduced into reaction zone 29 through tubular members 50 so that the third reactant mixes with the reaction products of the primary flame 48. This results in formation of a secondary flame 51 due to the burning of the residual reducing gas to form its oxidized product and the conversion of the uranium dioxide rich composition to a composition rich in uranium oxides as previously described. The tubular members 50 are mounted so that the incoming third reactant gas enters the reaction zone 29 at the point where the uranium hexafluoride conversion to the transient particulate uranium dioxide rich composition is substantially complete. This patent in the names of Abdul G. Dada, W. R. DeHollander and Robert J. Sloat is assigned to the same assignee as the present invention and is hereby incorporated by reference.

Another very successful method of replacing the ammonium diuranate conversion process by gas phase reaction of uranium hexafluoride is described in co-pending U.S. patent application Ser. No. 387,529 filed August 10, 1973, now abandoned in favor of continuation application Serial Number 663,274 entitled Process for Producing Uranium Oxide Rich Composition from Uranium Hexafluoride which is hereby incorporated by reference. This patent application was filed March 3, 1976 in the names of W. R. DeHollander and C. P. Fenimore and is assigned to the same assignee as the present invention. This process gives the conversion of gaseous uranium hexafluoride to a uranium oxide rich composition in the presence of an active flame in a reactor defining a reaction zone by separately introducing a first gaseous reactant comprising a mixture of uranium hexafluoride and a reducing carrier gas and a second gaseous reactant comprising an oxygen-containing gas, the reactants being separated by a shielding gas as introduced to the reaction zone. The shielding gas temporarily separates the gaseous reactants and temporarily prevents substantial mixing and reacting of the gaseous reactants. The flame occurring in the reaction zone is maintained away from contact with the inlet introducing the mixture to the reaction zone. This process can also include a post oxidation step.

This post oxidation process for producing uranium oxide rich compositions has introduction of all the third gaseous reactant of an oxygen-containing gas at one location which gives a region of concentrated flame reaction and elevated flame temperature. The temperature of this post oxidation process is controlled to avoid loss of desirable ceramic properties of the resulting powder such as surface area. Further, the control of process temperatures can serve as a limitation on the production rate of the conversion reaction of uranium hexafluoride to a uranium oxide rich composition.

OBJECTS OF THE INVENTION

It is a principle object of this invention to provide multiple downstream inlets for the third gaseous reactant of an oxygen-containing gas for the post oxidation step of a process for converting gaseous uranium hexafluoride to a uranium oxide rich composition.

It is another object of this invention to limit the temperature reached throughout the portion of the reaction zone in which there is conducted a post oxidation step in a process for converting gaseous uranium hexafluoride to a uranium oxide rich product.

It is an associated object of this invention to distribute more uniformly throughout the reaction zone the heat created in the post oxidation step in a process for converting gaseous uranium hexafluoride to a uranium oxide rich product.

It is another object of this invention to provide a process preserving the desirable ceramic properties of a uranium oxide rich powder produced by a flame conversion of uranium hexafluoride.

Other objects and advantages of this invention will become apparent to a person skilled in the art from a reading of the following summary and description of the invention, the appended claims and by reference to the accompanying drawings described immediately hereinafter.

SUMMARY OF THE INVENTION

Figure 1:
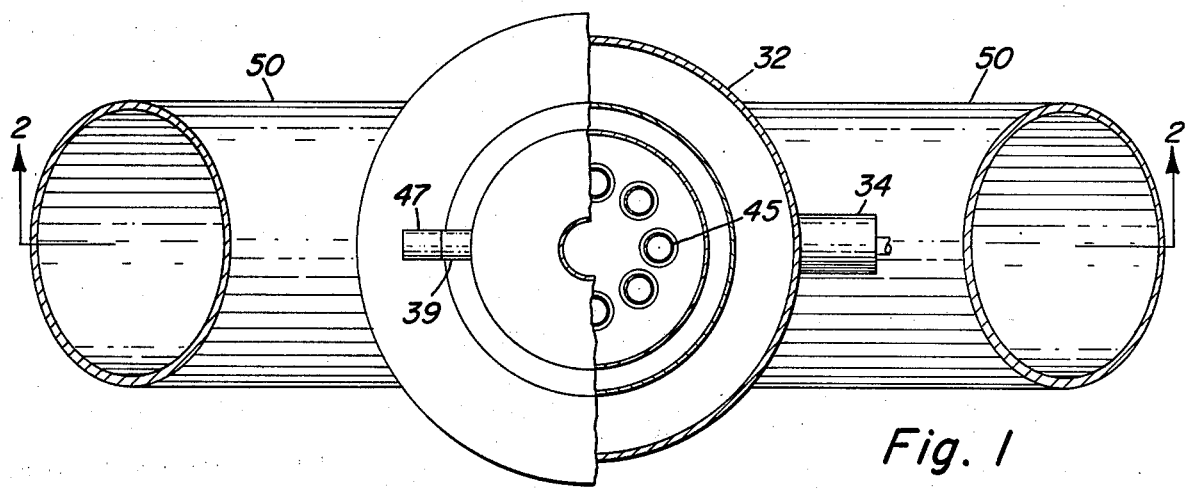
FIGS. 1 and 2 show respectively a top view partically cut away and a sectional side view of an apparatus for conducting a post oxidation process for producing a uranium oxide rich composition as discussed above in the section entitled Background of the Invention.

It has now been discovered that an improved process for the flame conversion of uranium hexafluoride to a uranium oxide product is achieved by the introduction of a third gaseous reactant comprising an oxygen-containing gas in the form of multiple streams into contact with the particulate uranium dioxide rich composition and the residual reducing gas resulting from the reaction of uranium hexafluoride with an oxygen-containing gas and a reducing gas. The stream closest to the primary flame is introduced at a location in the reaction zone where the uranium hexafluoride conversion to the uranium dioxide rich composition is substantially complete and with at least one of the multiple streams being positioned downstream from the stream closest to the primary flame so that the heat of reaction is dispersed in the reaction zone. This substantially spreads the heat of reaction of the post oxidation step over the portion of the reaction zone covered by the multiple inlets so that there is not a confined zone of high temperature. In this manner, the desirable ceramic properties of the resulting uranium oxide rich powder formed in this process are preserved since the powder does not encounter a confined zone of high temperature. Further, economies are realized in that this improvement enables a higher sustained rate of production of the uranium oxide rich powder because there is no longer a confined zone of the heat of reaction imposing a limitation on the rate of production of the powder.

This process also permits operation of the conversion reaction with less of the oxygen-containing gas, i.e., a more reductive process, at the nozzle inlet which yields a ceramically more active powder.

DETAILED DESCRIPTION OF THE INVENTION

The foregoing objects have been accomplished in a new process for thermal conversion of gaseous uranium hexafluoride to a uranium oxide rich composition in the presence of an autogenous flame in a reaction zone which separately receives a mixture of uranium hexafluoride and an oxygen-containing gas as a first gaseous reactant, a reducing gas as a second gaseous reactant, a shielding gas introduced to separate temporarily the first and second gaseous reactants from one another and temporarily preventing substantial mixing and reaction of the first and second gaseous reactants, and a third gaseous reactant comprising an oxygen-containing gas introduced as multiple streams into contact with the transient reaction product of the particulate uranium dioxide rich composition and the residual reducing gas with the stream closest to the primary flame being at a position in the reaction zone where the uranium hexafluoride conversion to the uranium dioxide rich composition is substantially complete. At least one of the multiple streams is positioned downstream from the other (i.e., further from the primary reaction flame) so that the heat of reaction is dispersed in the reaction zone. The shielding gas temporary prevents the reducing gas from diffusing into the uranium hexafluoride-oxygen-containing gas mixture and also prevents diffusion of the uranium hexafluoride-oxygen-containing gas mixture into the reducing gas until the mixture has moved away from the inlet through which the gas mixture is introduced into the reaction zone. Soon after entering the reaction zone, sufficient cross diffusion of the first and second gaseous reactants through the shielding gas occurs and the flame reaction occurs between the uranium hexafluoride, the oxygen-containing gas and the reducing gas. This reaction results in a transient formation of a particulate uranium dioxide rich composition and gaseous by-products including residual reducing gas. The third reactant, an oxygen-containing gas, reacts with the particulate uranium dioxide rich composition and the gaseous by-products including the residual reducing gas yielding a particulate uranium oxide rich composition and converting the reducing gas to its oxidized form. The particular uranium oxide formed depends on the ratio of the molar volume of the third reactant and the molar volumes of the transient particulate uranium dioxide rich composition and the residual reducing gas.

In another embodiment of the invention there is practiced a new process for thermal conversion of gaseous uranium hexafluoride to a uranium oxide rich compositionn in the presence of an autogenous flame in a reaction zone which separately receives a mixture of uranium hexafluoride and a reducing gas as a first gaseous reactant, an oxygen-containing gas as a second gaseous reactant, a shielding gas introduced to separate temporarily the first and second gaseous reactants from one another and temporarily preventing substantial mixing and reaction of the first and second gaseous reactants, and a third gaseous reactant comprising an oxygen-containing gas introduced as multiple streams into contact with the transient reaction product of the particulate uranium dioxide rich composition and the residual reducing gas with the stream closest to the primary flame being at a position in the reaction zone where the uranium hexafluoride conversion to the uranium dioxide rich composition is substantially complete. At least one of the multiple streams is positioned downstream from the other so that the heat of reaction is dispersed in the reaction zone. The shielding gas temporarily prevents the oxygen-containing gas from diffusing into the uranium hexafluoride-reducing gas mixture and also prevents diffusion of the uranium hexafluoride-reducing gas mixture into the oxygen-containing gas until the mixture has moved away from the inlet through which the gas mixture is introduced into the reaction zone. Soon after entering the reaction zone, sufficient cross diffusion of the first and second gaseous reactants through the shielding gas occurs and the flame reaction occurs between the uranium hexafluoride, the oxygen-containing gas and the reducing gas. This reaction results in the formation of a transient particulate uranium dioxide rich composition and gaseous by-products including residual reducing gas. The third reactant, and oxygen-containing gas, reacts with the particulate uranium dioxide rich composition and the gaseous by-products including the residual reducing gas yielding a particulate uranium oxide rich composition and converting the reducing gas to its oxidized form.

Figure 2:
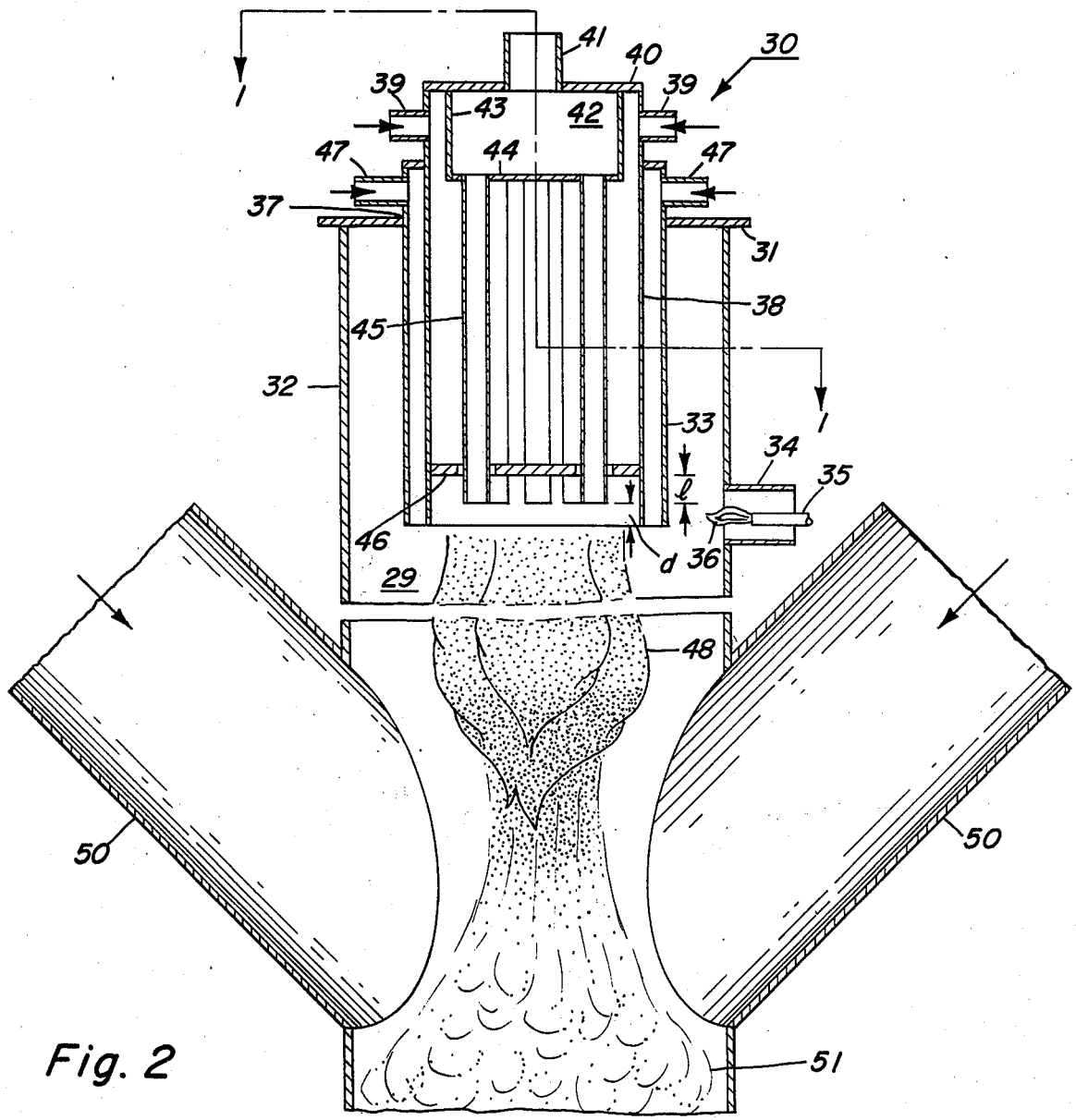
Figure 3:
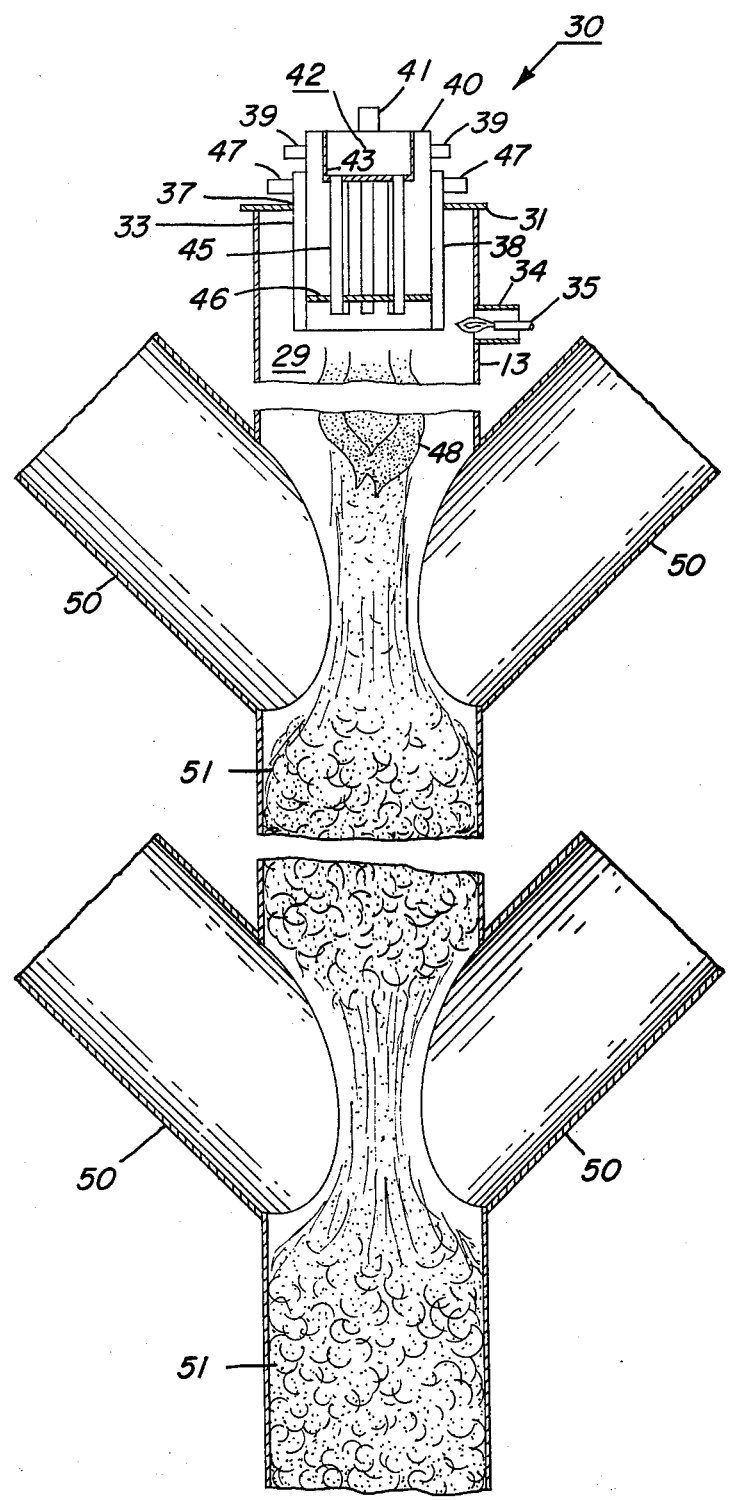
FIG. 3 is a sectional side view of the upper portion of a reactor used in the practice of this invention having multiple downstream inlets for the third gaseous reactant of an oxygen-containing gas.

Referring now to FIG. 3, there is shown a reactor having the same nozzle generally designated as 30 as in FIGS. 1 and 2, and the same reference numbers are used to identify the components as in FIGS. 1 and 2.

In use in one embodiment of the process, a continuous flow of a reactant of a reducing gas selected from the group consisting of hydrogen, dissociated ammonia and mixtures thereof is maintained in tube 33 to the reaction zone 29. A shielding gas is fed through inlets 39 into tube 38 and into the reaction zone 29. The shielding gas can be a non-reactive gas selected from the group consisting of nitrogen, argon, helium, neon, krypton, xenon and mixtures thereof or the shielding gas can be a reactive gas selected from the group consisting of oxygen, air or a mixture thereof, or either air, oxygen or a mixture of air and oxygen with any of the foregoing non-reactive gases. A reactant comprising a mixture of uranium hexafluoride and aan oxygen-containing gas is fed through inlet 41, chamber 42 and tubes 45 into reaction zone 29. The oxygen-containing gas is selected from the group consisting of oxygen, air and mixtures thereof. The flow of the gases in tubes 38 and 45 occur so that the shielding gas in tube 38 surrounds the jets of gaseouss reactant coming from tubes 45 as the gases enter the reaction zone 29. The shielding gas shields the mixture of uranium hexafluoride and the oxygen-containing gas from the reducing gas for sufficient time so that the boundary of initiation of the reaction flame 48 in the reaction zone 29 is removed from contact with tube 38.

Multiple inlets 50, preferably constructed of the same material as the vessel 13, such as Monel$^R$ or Inconel$^R$, are provided and are used to introduce the third gaseous reactant into the reaction zone in contact with the uranium dioxide rich composition and the gaseous by-products. The multiple inlets 50 are preferably tubular members of cylindrical cross section. The inlets 50 closest to the primary flame 48 are located in the reaction zone such that the uranium hexafluoride conversion to the uranium dioxide rich composition is substantially complete. In FIG. 3, this position for the inlets 50 closest to the primary flame 48 is shown as being near the tip of primary flame 48. The oxygen-containing gas is fed in inlets 50 so that it enters the reaction zone 29 and mixes with the reaction products. This results in a secondary flame 51 from the burning of the residual reducing gas to its oxidized product and the conversion of the uranium dioxide rich composition to a composition rich in uranium oxide(s) having some oxide in a higher state of oxidation than uranium dioxide. The following are representative of such uranium oxide(s): uranium tritaoctoxide ($U_3O_8$), uranium trioxide ($UO_3$), uranium pentoxide ($U_2O_5$), $U_4O_9$ and mixtures of any of the foregoing, with or without the presence of some uranium dioxide ($UO_2$).

Introduction of each portion of the third gaseous reactant must be done before the residual heat of the materials moving through the reaction zone decreases below the temperature needed for ignition of the resulting mixture of these materials with the third gaseous reactant.

In use in another embodiment of the process, a continuous flow of a reactant of an oxygen-containing gas selected from the group consisting of oxygen, air and mixtures thereof is maintained in tube 33 to the reaction zone 29. A shielding gas is fed through inlets 39 into tube 38 and into the reaction zone 29. The shielding gas can be a non-reactive gas selected from the group consisting of nitrogen, argon, helium, neon, krypton, xenon and mixtures thereof or the shielding gas can be a reactive gas selected from the group consisting of oxygen, air or a mixture theorof, or either air, oxygen or a mixture of air and oxygen with any of the foregoing non-reactive gases. A reactant comprising a mixture of uranium hexafluoride and a reducing gas is fed through inlet 41, chamber 42 and tube 45 into reaction zone 29. The reducing gas is selected from the group consisting of hydrogen, dissociated ammonia and mixtures thereof. The flows of gases in tubes 38 and 45 occur so that the shielding gas in tubes 38 surrounds the jets of gaseous reactant coming from tubes 45 as the gases enter the reaction zone 29. The shielding gas shields the mixture of uranium hexafluoride and the reducing gas from the oxygen-containing gas for sufficient time so that the boundary of initiation of the reaction flame 48 in the reaction zone 29 is removed from contact with tube 38.

Multiple inlets 50 are used to introduce the third gaseous reactant into the reaction zone in contact with the uranium dioxde rich composition and the gaseous by-products. The oxygen-containing gas is fed in inlets 50 so that it enters the reaction zone 29 and mixes with the reaction products. This results in a secondary flame 51 from the burning of the residual reducing gas to its oxidized product and the conversion of the uranium dioxide rich composition to a composition rich in uranium oxide(s) having some oxide in a higher state of oxidation than uranium dioxide.

It is preferred practice to introduce the oxygen-containing gas as the third reactant at a sufficient rate so that the ratio of the moles of oxygen [O] so introduced is at least equal to the sum of the moles of oxygen needed for achieving the desired uranium oxide product ($x$) and ½ the number of moles of residual reducing gas ($y$), where the reducing gas is hydrogen, less the sum of the moles of oxygen in the oxygen-containing gas and shielding gas ($z$). This gives an equation as follows: $[O] = (x) + (y) - (z)$.

Figure 4:
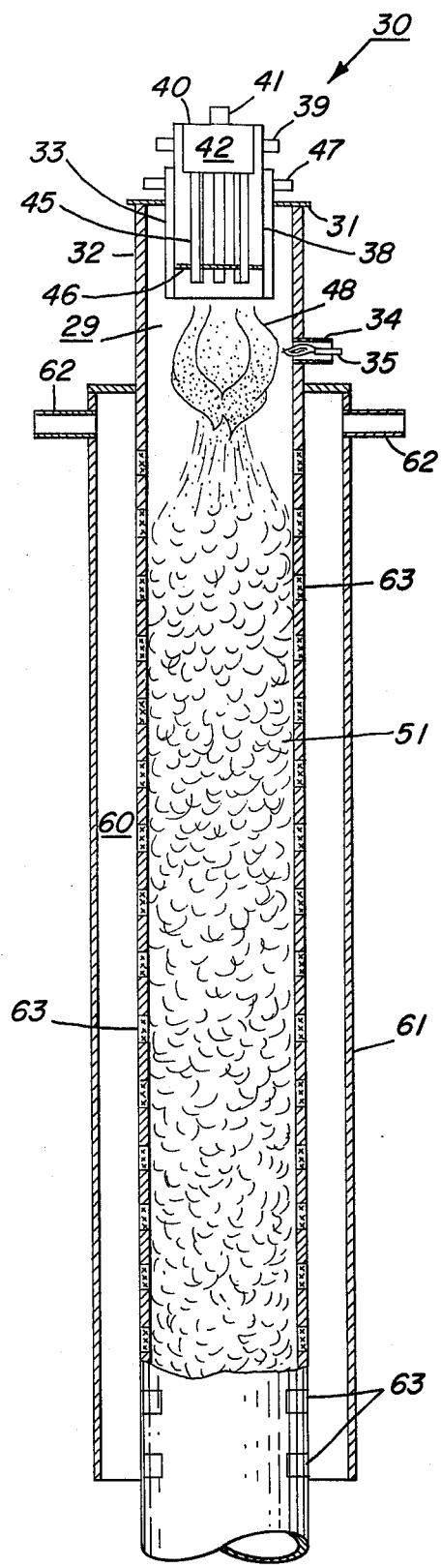
FIG. 4 is a sectional side view of the upper portion of another embodiment of a reactor used in the practice of this invention having multiple downstream inlets for the third gaseous reactant of an oxygen-containing gas.
Figure 5:
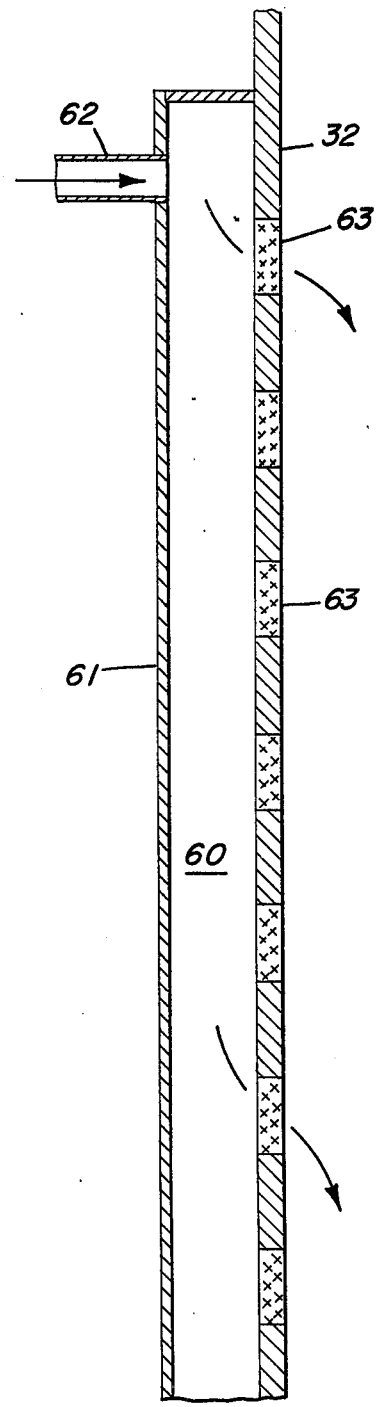
FIG. 5 is an enlarged sectional side view of a portion of the reactor shown in FIG. 4.

Another embodiment of the invention is presented in FIGS. 4 and 5 with the same reference numbers being used to identify the components corresponding to those in FIGS. 1–3. In this embodiment the oxygen-containing gas as the third gaseous reactant is introduced into reaction zone 29 through a chamber 60 having a wall 61 surrounding the vessel 32. Tubular members 62 introduce the oxygen-containing gas into chamber 60 and porous metal sections 63 enable a flow of the oxygen-containing gas therethrough into reaction zone 29. The first porous metal sections 63 closest to the primary flame are at a location where the uranium hexafluoride conversion to a uranium dioxide rich composition is substantially complete. In FIGS. 4 and 5 this position is shown as being near the tip of primary flame 48. As the oxygen-containing gas is fed through the porous metal sections 63 into reaction zone 29, it mixes with the reaction products. This results in a secondary flame 51 from the burning of the residual reducing gas to its oxidized form and the conversion of the uranium dioxide rich composition to a composition rich in uranium oxide(s) having some oxides in a higher state of oxidation than uranium dioxide.

The porous metal sections 63 are fabricated of sintered metal such as Monel$^R$ with a given porosity such as Grade D porous Monel$^R$ as manufactured by the Pall Corporation, Cortland, New York. The sections 63 permit the oxygen-containing gas to pass through the pores into the reaction zone 29. This provides numerous distribution points or inlets of the oxygen-containing gas along the reaction zone displaced downstream from the primary flame and will give an even reaction between the oxygen-containing gas, the uranium dioxide rich composition and the residual reducing gas, e.g., hydrogen.

This invention enables any desired $H_2/O_2$ ratio to be selected for the region of the reaction zone 29 adjacent the nozzle, and ratios above a 4 to 1 limitation keep the post oxidation temperature below a desired maximum of about 2200°F. Accordingly this invention allows the practice of establishing a highly reductive flame, e.g., a 6 to 1 $H_2/O_2$ ratio, at the nozzle without encountering high post oxidation temperatures. The third gaseous reactant required in the post oxidation step to oxidize the excess reducing gas is introduced to the reaction zone and distributed over the region of the reaction zone 29 as shown in FIGS. 3–5. This results in controlled distribution of the heat of reaction for the post oxidation step over the length of the post oxidation (post burn) zone with the desirable result that the reaction zone 29 where post oxidation step occurs has no flame temperature above about 2200°F. The oxygen-containing gas may be distributed between the inlets in FIGS. 3 and 4 in any proportion, however a preferred embodiment of the invention is to distribute to each inlet an amount of the oxygen-containing gas which distributes the heat of reaction of the post oxidation step equally across the portion of the reaction zone in which post oxidation occurs.

The present invention achieves additional advantages by the conversion of uranium hexafluoride to a uranium oxide rich composition. The uranium oxide composition is not exposed to temperatures above about 2200°F so that desirable properties of the composition and ceramic structure are not altered by exposure to high reaction zone temperatures (i.e., temperatures significantly above 2200°F). This invention also permits higher sustained rates of production of the uranium oxide rich composition in the same reactor equipment without encountering flame temperatures significantly above about 2200°F.

Any of the apparatus and process embodiments presented in the aforementioned U.S. Pat. No. 3,796,672, U.S. Pat. No. 3,790,493 and U.S. Pat. No. 3,814,327 can be utilized with the improvement presented in this invention. Particular reference is made to any of the configurations for reactant inlets, the start up sequences, the preferred molar proportions for gases, the flame temperatures, the preferred use of vacuum conditions and the distance "d". The start up sequences of the aforementioned U.S. Pat. No. 3,796,672 are modified so that when the flow of the oxygen-containing gas is started, the flow of oxygen-containing gas for the post oxidation step is also started. The reactions postulated in the aforementioned U.S. Pat. No. 3,796,672 are also felt to be applicable to the reactions in the process of this invention prior to the step of subsequently oxidizing or burning the products of flame 48.

The uranium oxide rich compositions produced in the practice of this invention are in the form of powders having superior properties. The powders contain preferably greater than 95 percent by weight of the uranium oxides as listed above with the balance being largely fluoride ions in the form of hydrogen fluoride and other compounds containing uranium and fluoride not generally identifiable by x-ray diffraction. The powder has excellent surface properties with high relative surface area for the particular composition of the powder.

As will be apparent to those skilled in the art, various modifications and changes may be made in the invention as described herein. It is accordingly the intention that the invention be construed in the broadest manner within the spirit and scope as set forth in the accompanying claims.

What is claimed is:

1. A method of preparing a uranium oxide rich composition from uranium hexafluoride in a reaction zone in the presence of an active flame having the steps of:
   a. introducing a first gaseous reactant comprising a mixture of uranium hexafluoride and an oxygen-containing gas into the reaction zone,
   b. introducing a second gaseous reactant comprising a reducing gas into the reaction zone,
   c. separately introducing a shielding gas in the reaction zone between the first gaseous reactant and the second gaseous reactant which temporarily prevents substantially mixing and reaction between the first and second gaseous reactants until sufficient cross diffusion of the reactants occurs as the reactants pass through the reaction zone resulting in a reaction producing a particulate uranium dioxide rich composition and gaseous reaction products, and
   d. introducing a third gaseous reactant comprising an oxygen-containing gas into contact with the particulate uranium dioxide rich composition and the gaseous reaction products in the form of multiple streams thereby converting the residual reducing gas in the reaction zone to an oxidized form and oxidizing the uranium dioxide rich composition to a higher oxide of uranium, with at least one of the multiple streams being positioned downstream from the other so that the heat of reaction is dispersed in the reaction zone.

2. The method of claim 1 where the method is initiated by the sequential steps of:
   a. introducing the shielding gas into the reaction zone,
   b. introducing the oxygen-containing gas for the uranium hexafluoride and the third gaseous reactant into the reaction zone,
   c. introducing the reducing gas into the reaction zone, and
   d. introducing the uranium hexafluoride to form a mixture with the oxygen-containing gas with the mixture entering the reaction zone temporarily separated from the reducing gas by the shielding gas.

3. The method of claim 2 in which the oxygen-containing gas and the uranium hexafluoride are introduced simultaneously into the reaction zone.

4. The method of claim 1 where the method is initiated by the sequential steps of:
   a. introducing the oxygen-containing gas for the uranium hexafluoride and the third gaseous reactant into the reaction zone,
   b. introducing the shielding gas into the reaction zone,
   c. introducing the reducing gas into the reaction zone, and
   d. introducing the uranium hexafluoride to form a mixture with the oxygen-containing gas with the mixture entering the reaction zone temporarily separated from the reducing gas by the shielding gas.

5. The method of claim 1 where the reaction zone is purged with an inert gas prior to introducing the gaseous reactants to the reaction zone.

6. The method of claim 1 wherein the first gaseous reactant comprising a mixture of uranium hexafluoride and an oxygen-containing gas is introduced into the reaction zone as a plurality of individual streams and the streams are surrounded by the shielding gas.

7. The method of claim 1 in which the reducing gas is selected from the group consisting of hydrogen, dissociated ammonia and mixtures thereof.

8. The method of claim 1 in which the oxygen-containing gas is selected from the group consisting of oxygen, air and mixture thereof.

9. The method of claim 1 in which the shielding gas is selected from the group consisting of nitrogen, argon, helium, neon, krypton, xenon, oxygen, air and mixtures thereof.

10. The method of claim 1 in which the third gaseous reactant is selected from the group consisting of oxygen, air and mixtures thereof.

11. The method of claim 1 in which the third gaseous reactant is oxygen.

12. The method of claim 1 in which the third gaseous reactant is air.

13. The method of claim 1 in which the third gaseous reactant is a mixture of oxygen and air.

14. The method of claim 1 in which there are more than two multiple streams of the third gaseous reactant being positioned downstream from each other.

15. A method of preparing a uranium oxide rich composition from uranium hexafluoride in a reaction zone in the presence of an active flame having the steps of:
   a. introducing a first gaseous reactant comprising a mixture of uranium hexafluoride and a reducing gas into the reaction zone,
   b. introducing a second gaseous reactant comprising an oxygen-containing gas into the reaction zone,
   c. separately introducing a shielding gas in the reaction zone between the first gaseous reactant and the second gaseous reactant which temporarily prevents substantial mixing and reaction between the first and second gaseous reactants until sufficient cross diffusion of the reactants occurs as the reactants pass through the reaction zone resulting in a reaction producing a particulate uranium dioxide rich composition and gaseous reaction products, and
   d. introducing a third gaseous reactant comprising an oxygen-containing gas into contact with the particulate uranium dioxide rich composition and the gaseous reaction products in the form of multiple streams thereby converting the residual reducing gas in the reaction zone to an oxidized form and oxidizing the uranium dioxide rich composition to a higher oxide of uranium, with at least one of the multiple streams being positioned downstream from the other so that the heat of reaction is dispersed in the reaction zone.

16. The method of claim 15 where the method is initiated by the sequential step of:
   a. introducing the shielding gas into the reaction zone,
   b. introducing the oxygen-containing gas and the third gaseous reactant into the reaction zone,
   c. introducing the reducing gas into the reaction zone,
   d. introducing the uranium hexafluoride to form a mixture with the reducing gas with the mixture entering the reaction zone temporarily separated from the oxygen-containing gas by the shielding gas.

17. The method of claim 16 in which the reducing gas and the uranium hexafluoride are introduced simultaneously into the reaction zone.

18. The method of claim 15 where the method is initiated by the sequential steps of:
   a. introducing the oxygen-containing carrier gas and the third gaseous reactant into the reaction zone,
   b. introducing the shielding gas into the reaction zone,
   c. introducing the reducing gas into the reaction zone, and
   d. introducing the uranium hexafluoride to form a mixture with the reducing gas with the mixture entering the reaction zone temporarily separated from the oxygen-containing gas by the shielding gas.

19. The method of claim 15 where the reaction zone is purged with an inert gas prior to introducing the gaseous reactants to the reaction zone.

20. The method of claim 15 wherein the first gaseous reactant comprising a mixture of uranium hexafluoride and a reducing gas is introduced into the reaction zone as a plurality of individual streams and the streams are surrounded by the shielding gas.

21. The method of claim 15 in which the reducing gas is selected from the group consisting of hydrogen, dissociated ammonia and mixtures thereof.

22. The method of claim 15 in which the oxygen-containing gas is selected from the group consisting of oxygen, air and mixtures thereof.

23. The method of claim 15 in which the shielding gas is selected from the group consisting of nitrogen, argon, helium, neon, krypton, xenon, oxygen, air and mixtures thereof.

24. The method of claim 15 in which the third gaseous reactant is selected from the group consisting of oxygen, air and mixtures thereof.

25. The method of claim 15 in which the third gaseous reactant is oxygen.

26. The method of claim 15 in which the third gaseous reactant is air.

27. The method of claim 15 in which the third gaseous reactant is a mixture of oxygen and air.

28. The method of claim 15 in which there are more than two multiple streams of the third gaseous reactant being positioned downstream from each other.

* * * * *